United States Patent [19]

Soster et al.

[11] Patent Number: 4,721,356
[45] Date of Patent: Jan. 26, 1988

[54] DEVICE FOR MUTUALLY ENGAGING THE OPTICAL FACES OF AT LEAST ONE PAIR OF OPTICAL FIBRES IN A CONNECTION DEVICE

[75] Inventors: Marie C. Soster, Reuil Malmaison; Jean M. Giraud, Maisons Lafitte, both of France

[73] Assignee: Amphenol Corporation, Wallingford, Conn.

[21] Appl. No.: 693,157

[22] Filed: Jan. 22, 1985

[30] Foreign Application Priority Data

Jan. 24, 1984 [FR] France ................... 84 01052

[51] Int. Cl.$^4$ ................................... G02B 6/36
[52] U.S. Cl. ........................... 350/96.20; 350/96.21
[58] Field of Search ............... 350/96.20, 96.21, 96.18, 350/96.22, 96.15

[56] References Cited

U.S. PATENT DOCUMENTS

| | | | |
|---|---|---|---|
| 4,416,506 | 11/1983 | Johnson et al. | 350/96.21 |
| 4,435,036 | 3/1984 | Sasakawa | 350/96.20 |
| 4,522,463 | 6/1985 | Schwenda et al. | 350/96.21 |
| 4,556,282 | 12/1985 | Delebecque | 350/96.21 |
| 4,602,845 | 7/1986 | Anderton | 350/96.20 |

FOREIGN PATENT DOCUMENTS 2034069 5/1980 United Kingdom .

OTHER PUBLICATIONS

Patents Abstract of Japan, vol. 6, No. 129 (P-128) (1007); & JP-A-57 54 909 (Nippon Denshin Denwa Kosha) (01-04-1982).

*Primary Examiner*—John Lee
*Attorney, Agent, or Firm*—Bacon & Thomas

[57] ABSTRACT

A device for mutually engaging the optical faces of at least one pair of optical fibres in a fiber connecting device comprises a mounting plate provided with means for detachably mounting in a given position with respect to the connecting device, at least one pair of clamping members adapted to assume a rest position where at least one of said fibres is left free and an active position where the said fibre is held in order to be displaced so as to be brought into engagement with the other fibre and means for displacing the said pair of clamping members toward said other fibre of the pair when the clamping members are in active position.

6 Claims, 5 Drawing Figures

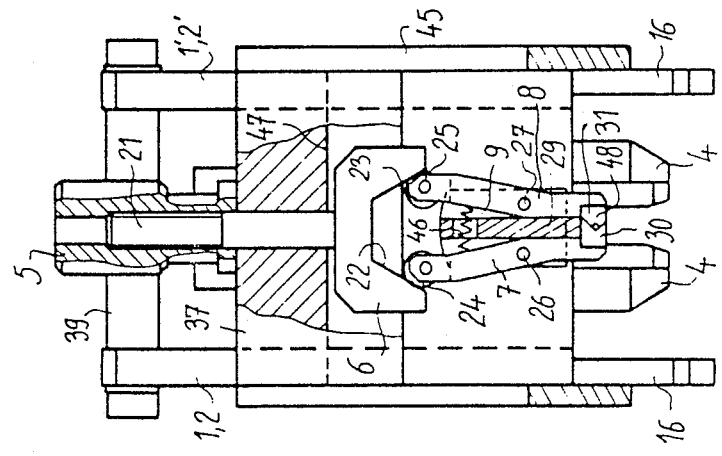
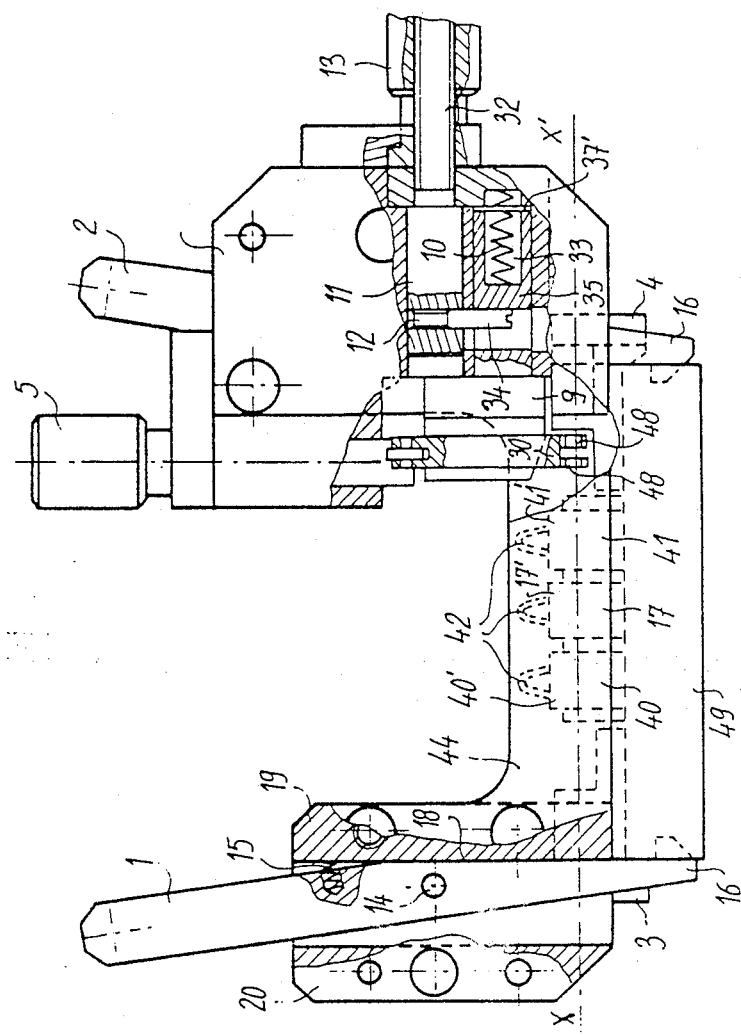
FIG_1-b
FIG_1-a

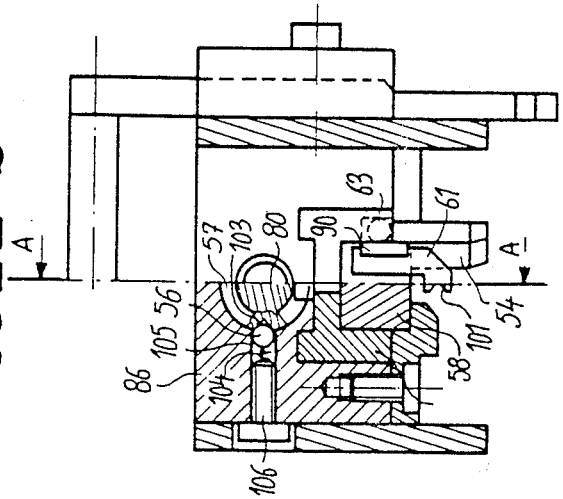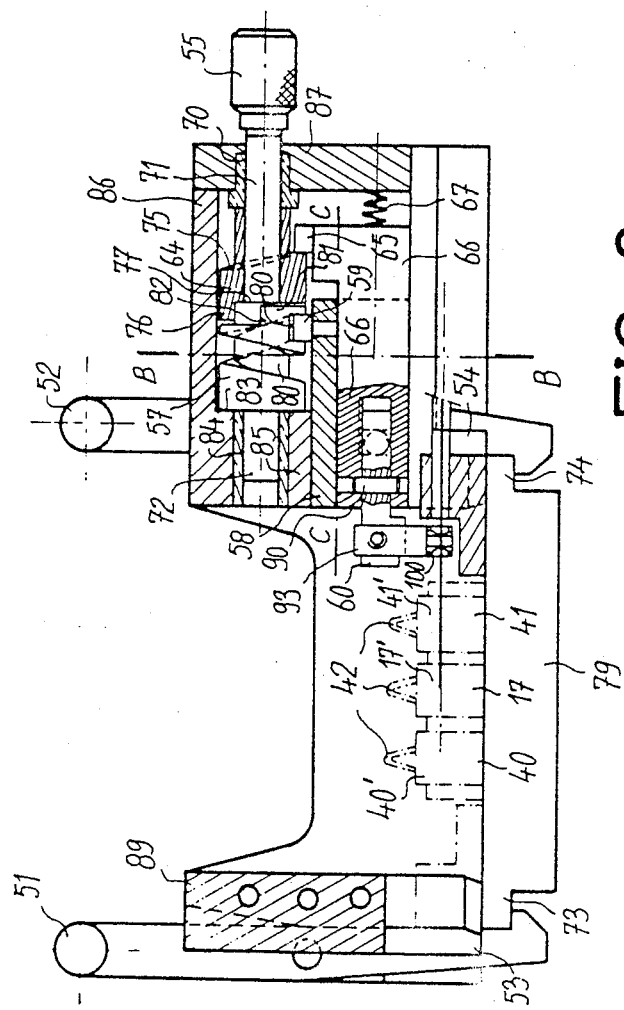

DEVICE FOR MUTUALLY ENGAGING THE OPTICAL FACES OF AT LEAST ONE PAIR OF OPTICAL FIBRES IN A CONNECTION DEVICE

BACKGROUND OF THE INVENTION

The present invention concerns a device for mutually engaging the optical faces of at least one pair of optical fibres in a connecting device.

The positioning of optical fibres in a connection device, for example, of the type presenting a V-shaped groove into which the fibres are placed end-to-end, requires the fibres to be brought into a mutually abutting position through longitudinal sliding displacement. This operation has until now been carried out manually.

The present invention provides a device which allows this abutting position to be obtained and in which the optical fiber is advanced without manual intervention by the operator.

The device according to the invention can be especially utilized with a connection device such as that disclosed in French patent application No. 83 20 197 filed Dec. 16, 1983 by the applicant and entitled "DISPOSITIF DE CONNEXION SEMI-PERMANENT POUR FIBRES OPTIQUES ET PROCEDE POUR SA MISE EN OEUVRE". It can also be used with other connection devices requiring end-to-end positioning through translational displacement of two optical fibres.

SUMMARY OF THE INVENTION

The present invention thus concerns a device for mutually engaging the optical faces of at least one pair of optical fibres in a connection device, comprising:

a base plate comprising means for removably mounting said plate in a given position with respect to said connection device;

at least one pair of clamping members movable between a rest position wherein at least one of said fibres is left free and an active position wherein said one fibre is clamped for being displaced in order to perform mutual fibre face engagement;

means for displacing said clamping members toward the other optical fibre of said pair when said clamping members are in the active position.

In one embodiment, the means for displacing said pair of clamping members comprises a screw as well as a catch driving a support bearing said clamping members. Said support can be urged by spring means in the direction corresponding to the engagement of the fibres and said catch can be disposed so as to constitute a movable stop member for said support so as to drive the same.

Each of the clamping members can comprise a spring-loaded arm the rotation of which about an axis is controlled by a slide between said two positions.

According to a preferred embodiment, the displacement of the clamping members as well as their positioning according to one or the other of the above-mentioned positions is carried out by a single control means which is arranged so as to control simultaneously the positions of said clamping members and the displacement of said support according to the following sequence:

rotating of the control means in a first direction in order to place the clamping members into the active position;

further rotating the control means in order to advance the moving support, which allows bringing the optical faces of the fibres into their position of mutual engagement;

rotating the control means in the opposite direction in order, first of all, to place the clamping members into the rest position and to draw back the support, which allows disengaging the fibre from the clamping members, when the optical faces of the fibres have been brought in mutual engagement.

According to one variant, a first lug is carried by the slide and is engaged in a helicoïdal groove carried by the said control, a ring is mounted free in rotation about a portion of the said control means and presents a second lug cooperating with a stop member so that the ring is rotating in order to cause the support to advance when the clamping members have been placed in the active position, said ring presenting a helicoïdal ramp cooperating with the said catch which is integral with the support, so as to displace said catch.

The slide can carry at one end a housing for each of the clamping members, each housing receiving a ball disposed in such a way as to transmit the translational movement of the slide in the form of a rotational movement of the clamping members.

BRIEF DESCRIPTION OF THE DRAWINGS

The invention will be better understood from reading the following description given by way of non-limitative example with reference to the appended figures wherein:

FIGS. 1a and 1b represent respectively in longitudinal and cross-sectional views, a first embodiment of the invention; and FIGS. 2a to 2c show respectively a longitudinal section, a partial cross-section and a partial horizontal section views the preferred embodiment of the invention.

DETAILED DESCRIPTION OF THE PREFERRED EMBODIMENT

According to FIGS. 1a and 1b, a fibre connecting device such as that described in the French patent application cited above comprises a support provided with a V-shaped groove adapted to receive the ends of the optical fibres to be put end-to-end, said support comprising three parts, namely a central part 17 designed to receive a realignment clamp 17' for flexibly maintaining the ends of the fibres which are stripped and joined end to end, and two end parts 40 and 41 each intended to receive a retention clamp 40' and 41' designed to maintain in position the fibres in a zone where they are not stripped, as well as clamping means 42 constituted by clips and adapted to hold the realignment clamp 17' of the retention clamp 40' and 41', these means having— as regards the realignment clamp (flexible clamp) and at least one retaining clamp—two clamping positions, the first allowing at least one optical fibre to slide along the V-shaped channel and the second ensuring its blocking in position.

The fibre connecting device is assembled on a terminal holder 49. Holder 49 can comprise a plurality of fibre connecting devices.

The device according to the invention comprises two side walls 44 and 45 each carrying two locking levers. Thus, FIGS. 1a and 1b represents side walls 44 and 45 carrying locking levers 1, 2 and 1', 2'. Each lower end of the four locking levers has the shape of a hook 16 which engage into a corresponding opening of terminal-holder 49. Each of the levers is urged by a return spring 15 and pivots about a horizontal axis 14. The levers are interconnected two-by-two through the intermediary of a horizontal bar 39.

Side walls 44 and 45 are carried by a body 37 which houses the mechanical controls of the device.

These controls consist, on the one hand, of a first control button 5 intended to put the clamping members into either of two positions, i.e. a rest position in which the fibre is left free to be displaced and a position in which the fibre is clamped, its displacement being thereafter realized by a translational motion of the clamping members which results from the action of a second control button 13.

More specifically, FIG. 1b represents button 5 which cooperates with a threaded rod 21 carrying at its lower end a fork 6 comprising two bevelled portions 22 and 23 cooperating with rollers 24 and 25 which are carried respectively by levers 7 and 8, pivotically mounted on axes 26 and 27 respectively. Levers 7 and 8 each carry at their lower end a clamping member, respectively 30 and 31 constituted by two nested V-shaped sections 48 the scissor-like overlapping action of which allows the fibre to be blocked in position. FIG. 1b shows that each of the clamping members presents two V-shaped sectors 48 mashing with the corresponding sectors of the opposite facing clamping member. Above axes 26 and 27, levers 7 and 8 are spread apart by a pressure spring 46 designed to maintain rollers 24 and 25 pressed against chamfers 22 and 23. Under these conditions, the lowering of fork 6 by the action on button 5 results in releasing the clamping members. Axes 26 and 27 are mounted on a support 9 provided with an extension 29 acting as a stop member for closing of the clamping members so as to avoid any excessive force exerted on the clamped fibre. The upward movement of fork 6 is restricted by a rim 47 of body 37. This also creates an abutment function with respect to closing of the clamping members, eventually capable of replacing that mentioned hereinabove.

The advance of support 9 which carries clamping members 30 and 31 is obtained by rotating control button 13. Button 13 actuates a rod 32 for advancing a slide 11 carrying a finger 12 the end of which 34 cooperates with a stop member 35 of the support 9 of the clamping members, said support being in turn urged forward by spring 10 disposed in a housing 33 and bearing on a housing of a plate 37'.

The device can be utilized in the following manner:
first of all, the device that is positioned on the fibre connecting device due to pairs of guides 3 and 4 is fixed onto terminal-holder 49 by using hooks 16 respectively actuatd by levers 1, 1', 2 and 2';

thereafter button 5 is turned in a clock-wise direction so that fork 6 is displaced upwards and releases clamping members 30 and 31 for them to hold the fibre. The fibre to be connected being clamped, button 13 is turned in an anti-clockwise direction in order to cause slide 11 to advance. This slide, through the intermediary of finger 12, releases the action of calibrated spring 10 that pushes the support 9 of the clamping members which hold the fibre;

button 13 is then turned further until the effect of the abutment produced is shown by the fact that the fibre held in clamping members 30 and 31 engages the first fibre already positioned in the connection module;

clips 42 are positioned so as to ensure holding of the second fibre;

thereafter, clip 42 of flexible clamp 17 is placed in position for realignment of the two fibres, in which they are maintained end to end in their V-shaped channel;

then clamping members 30 and 31 are opened by turning button 5 in an anti-clockwise direction in order to cause fork 6 to be displaced downwards;

the tool is disengaged from the terminal-holder by opening hooks 1, 16 respectively actuated by levers 2, 1' and 2' and the tool is put back into operational position for a subsequent operation.

As illustrated in FIGS. 2a to 2c, the tool according to the invention allows performing all operations for clamping and unclamping the advancing fibre by means of a single control button 55.

The tool according to the invention is mounted by tongs 51 and 52 on a mounting plate 79 carrying a connecting device 17, 40, 41. Clamping members 60 and 61 are each mounted rotatively on an axis 90. Each of clamping members 60 and 61 comprises at one end a support 93 having two V-shaped profiles, designated by reference numeral 100 for clamping member 60, and 101 for clamping member 61. At the other end, each of clamping members 60 and 61 presents a thickened portion 91 cooperating with a ball 62 that is held between said portion 91 and a thickened portion 94 of a push-button 58. At the lower portion of thickened portion 91, each of clamping members 60 and 61 is pushed by a spring 92 in the direction of closing off, i.e. clamping of the fibre.

The axes of rotation 90 of clamping members 60 and 61 are carried by a movable support 66 urged at its rear portion by a pressure spring 67 which tends to push the movable support 66 in the direction corresponding to the advance of the optical fibre. The forward displacement of the movable support 66 is limited by a stop member 65 cooperating with a helicoïdal ramp 75 of a ring 64 mounted free in rotation on a portion 71 of an axis 72.

Movable carriage 58 is associated with a catch 59 cooperating with a helicoïdal groove 80 defined by a central portion 57 of axis 72 which is rotated by actuating knob 55.

Axis 72 has a longitudinal track 103 in which engages a ball 56 pushed by a spring 104 disposed in a housing 105 and positioned by a screw 106. A ball 56' similarly corresponds to ring 64 and engages a groove 103' provided therein (not shown). This optional arrangement allows to indicate the rest position for the clamping members when they are in rear and open position.

The tool is operated in the following manner.

First of all the tool is fixed onto terminal-holder 79 by means of hooks 51 and 52 and is positioned on the fibre connecting device through the use of guides analogous to guides 3 and 4 of FIGS. 1a and 1b (but not shown).

From rest position in which balls 56 are engaged in grooves 103 and 103', knurled button 55 is turned in a clockwise direction which drives axis 72 provided with a helicoïdal ramp 80, thereby causing fork 58 to advance through interaction with catch 59. Fork 58 closes clamping members 60 and 61 by liberating balls 62. This operation is carried out while axis 72 is rotated by 180° and its purpose is to clamp the fibre that will subsequently be displaced in such a way as to engage the fibre already positioned in connecting device 17, 40, 41. During this first rotation of 180°, ring 64 is not put into motion.

When rotation continues beyond 180°, ring 57 drives ring 64 through cooperation between a rim 81 of ring 57 and a lug 76 of ring 64. Under the effect of rotation of ring 64, stop member 65 carried by moving carriage 66 follows the outline of the helicoïdal ramp forming a cam, which results in advancing carriage 66 and consequently the optical fibre clamped by clamping members 60 and 61. This movement is continued until a mechanical stop member is reached, which corresponds to the fact that the optical fibre displaced by the clamping members is stopped upon engagement with the first fibre previously positioned in the connecting device.

The total rotation of axis 57 is carried out nominally over 360°. It will be noted that fork 58 continues to be driven by helicoïdal ramp 80 when movable support 66 is advanced.

The optical fibres having been placed end to end, clips 42 of retaining clamp 41 are placed in blocking position in order to maintain the second fibre, and clip 42 of flexible clamp 17' is put into fibre realignment position.

Thereafter, button 55 is turned in an anti-clockwise direction. Fork 58 withdraws and again engages balls 62 that initiate the release of clamping members 60 and 61. After rotation of 180°, rim 81 of axis 72 drives ring 64 by its lug 76, which allows movable support 66 to withdraw, this movement being continued up to the mechanical abutment corresponding to the rest position. The rear position of the mechanism is confirmed by the two balls 56 and 56' snapping into their respective tracks 103 and 103' on axis 72 and ring 64. The tool can thus be disengaged from terminal holder 79 by releasing the hooks 51 and 52, whereafter it can be utilized for a subsequent operation.

We claim:

1. a device for mutually engaging the optical faces of at least one pair of optical fibres in a connecting device, comprising:
   a base plate comprising means for removably mounting said plate in a given position with respect to said connecting device, and said base plate constructed for having at least one of said fibres supported in a predetermined position thereon;
   at least one pair of clamping members movable between a rest position wherein at least another of said fibres is left free and an active position wherein the at least another fibre is clamped in a manner for being displaced in order to perform mutual fibre face engagement with the at least one fibre on the base plate, and wherein each clamping member comprises an arm urged by a spring into rotation about an axis thereof, and the rotation of which about the respective axes between one or the other of the rest and active positions is controlled by a slide; and
   means for displacing said clamping members toward one optical fibre of said pair when said clamping members are in said active position.

2. A device according to claim 1, in which the means for displacing said at least one pair of clamping members comprises a finger (12) for driving a moving support which carries said at least one pair of clamping members.

3. A device according to claim 2, in which said moving support is urged by a spring in the direction where the fibre faces are to be mutually engaged, and in which said finger (12) is disposed to define a moving stop member urged by the spring for engaging said moving support and for driving said moving support into a predetermined position.

4. A device according to claim 3, in which each of the clamping members comprises an arm urged by a spring into rotation about an axis thereof, and the rotation of which about the respective axes between one or the other of the rest and active positions is controlled by a slide, an axis being positioned for simultaneously controlling the position of said clamping members and the displacement of said moving support, and said axis being configured with respect to said clamping members and said moving support in a manner such that:
   said axis is rotatable a first predetermined amount in a first direction for placing the clamping members into said active position;
   said axis is further rotatable a second predetermined amount for advancing the moving support into a position causing the optical faces of the fibres to mutually engage; and
   said axis being rotatable in a direction opposite the direction of said rotation in said first and second predetermined amounts for moving the clamping members back into the rest position and for drawing back the support, whereby the fibres can be disengaged from the clamping members when the optical faces of the fibres are mutually engaged.

5. A device according to claim 4 wherein a first lug is carried by the slide in a position for engaging in a helicoïdal groove provided on said axis, a ring is mounted in a manner such that it is freely rotatable about a portion of said axis and a second lug is provided in cooperation with a stop member associated with said axis for rotating the ring for advancing the moving support after the clamping members have been placed in active position, and said ring having a helicoïdal ramp extending in cooperation with said finger which is integral with the moving support for displacing said support.

6. A device according to claim 1, in which the slide has at one of its ends a thickened portion for engaging with each of the clamping members, the thickened portion cooperating with a corresponding thickened portion of a clamping member for receiving a ball disposed therein for transmitting translational movement of the slide into a rotative movement of the clamping member about the axis thereof.

* * * * *